(No Model.)
B. O. CLARK.
IRRIGATING SYSTEM.
No. 496,187. Patented Apr. 25, 1893.
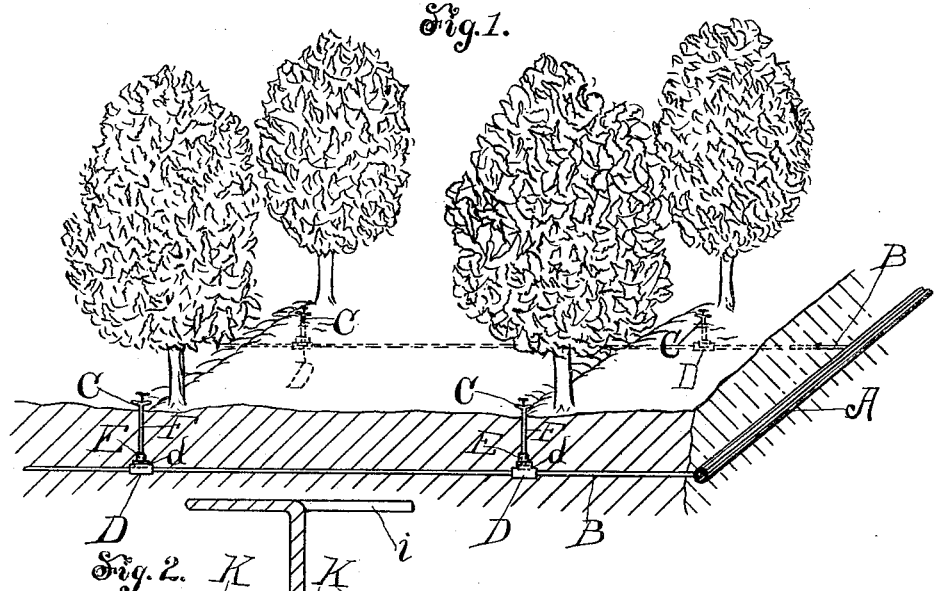
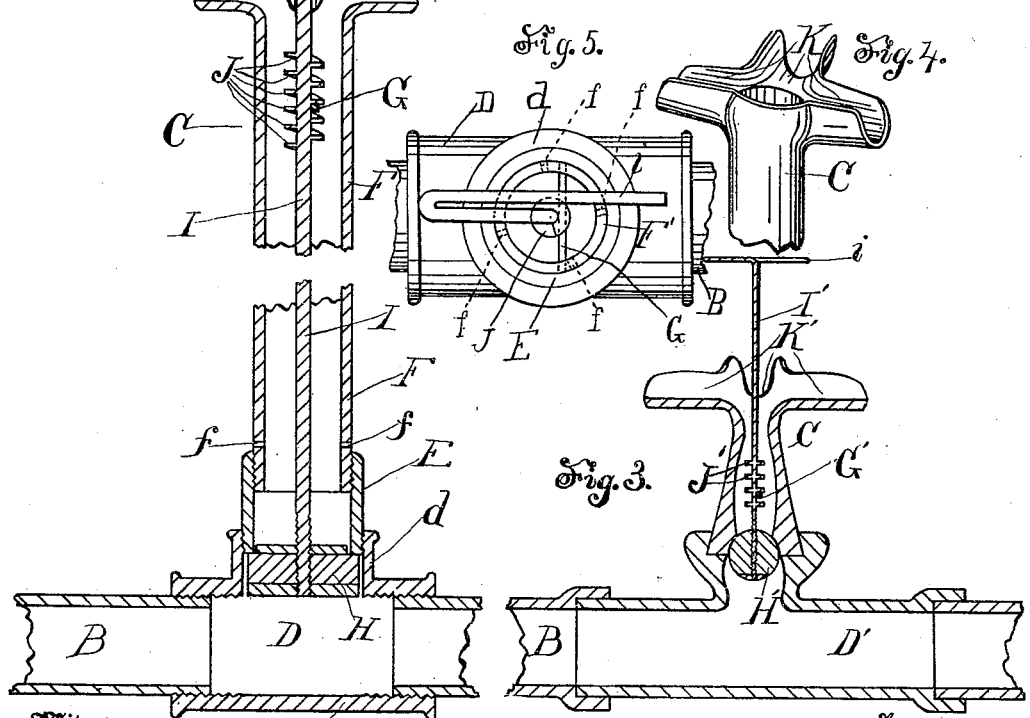

UNITED STATES PATENT OFFICE.

BYRON O. CLARK, OF PASADENA, CALIFORNIA.

IRRIGATING SYSTEM.

SPECIFICATION forming part of Letters Patent No. 496,187, dated April 25, 1893.

Application filed November 3, 1891. Serial No. 410,710. (No model.)

*To all whom it may concern:*

Be it known that I, BYRON O. CLARK, a citizen of the United States, residing at Pasadena, in the county of Los Angeles and State of California, have invented a new and useful Improvement in Irrigating Systems, of which the following is a specification.

My invention is designed for use in the irrigation of trees and plants and is adapted for use in both surface and sub-irrigation.

One object of my invention is to provide a practical surface and sub-irrigating system for use with water under pressure, in small and comparatively inexpensive pipes.

Another object is to provide a sub-irrigating system which is not liable to become clogged by ingrowing roots of trees or other plants; also to provide means whereby the pipes may be readily freed from such ingrowing roots.

The accompanying drawings illustrate my invention.

Figure 1 represents my irrigating system applied to an orchard. Fig. 2 is a vertical mid-section of one form of the hydrant employed by me as a part of my improved system as applied for both surface and sub-irrigation. Fig. 3 is a vertical mid-section of another form of said hydrant designed for surface irrigation only. Fig. 4 is a perspective view of the top of the hydrant shown in Fig. 3. Fig. 5 is a plan view of a hydrant designed for sub-irrigation only.

My invention embraces an irrigation system comprising a series of pressure water pipes each provided with a series of hydrants having underground and surface discharge openings and arranged at intervals in the orchard, vineyard or other field to be irrigated. It also embraces the peculiar hydrant employed by which I secure effective action, convenient cleansing and cheap construction.

In the drawings A represents a supply main arranged along one side of the plot to be irrigated.

B, B, represent the pressure water pipes which are provided with the hydrants C, C. The pipes B may ordinarily be made of three quarter inch iron pipe and are provided at the points where the hydrants are attached, with T's D, D, into the stems *d* of which the standard of the hydrant is secured.

The hydrant comprises the combination of the T (D) of the water pipe, a reducer E screwed into the stem of the T, (or same result may be obtained by special fixtures forming a valve seat opening downward by preference,) the hydrant pipe F screwed into such reducer and provided with the seepage perforations *f, f*, near the bottom thereof and the transverse plug securing bar G, the plug H or ball valve fitted to close the lower end of the reducer or hydrant pipe, and attached to the plug rod I provided at its upper end with a handle *i* and with suitable flanges or projections (either spiral or straight) J arranged to engage the transverse bar G or other suitable connections to sustain the plug.

In the form shown in Fig. 2 the rod I may be flexible in order that it may spring sufficiently to allow the flanges J to be disengaged from the bar G without twisting the plug H from its seat, but in the form illustrated in Fig. 3 the rod may be stiff, as the plug is globular and will fit its seat irrespective of the position of the rod I. The top of the hydrant pipe F is formed with two or more spouts K K K arranged in T shape so that when the water is used for surface irrigation, each hydrant will deliver three streams which may be conducted in three different directions or may be joined and all conducted to one point as may be desired. More spouts may be provided if deemed desirable, or only one or two may be used.

In practice when it is desired to water the plants or trees by sub-irrigation the rod is drawn to one side to disengage the flanges J from the transverse bar G, and the plug H is pushed downward sufficient to allow the amount of water desired to be forced up into the hydrant pipe F and escape through the holes *f*, allowing the water to percolate through the soil to the roots of the trees without wetting the surface soil, thus saving cultivation and economizing water. The plug and rod are secured in this position by engaging one of the projections or flanges J upon the cross bar G, which may be spiral as shown so that by twisting the rod the plug is drawn tightly into its seat.

When it is desired to irrigate upon the surface at the same time, the plug H is lowered far enough into the T (D) to partially obstruct the passage of the water and cause it to force up through the hydrant pipe F and out of the troughs K at the top, when it is conducted into the furrows prepared for irrigating, while at the same time the water is also escaping through the perforations *f* in the hydrant pipe F, thus causing speedy and thorough saturation of the ground.

In Fig. 3 I have illustrated my invention as applied to vitrified clay pipe or other large pipes and adapted for surface irrigation only.

The hydrant stem in Fig. 2 is revoluble to a greater or less extent and if the roots from the trees or other plants grow through the perforations *f*, the hydrant pipe F can be twisted partially around and back again thus cutting off the roots so they may be carried out by the flowing water, and if not sufficient, a few shovels of dirt will lay bare the obstruction as it can only be clogged at this point. The hydrant has its valve plug preferably arranged beneath its valve seat to open downward so that the water flowing over the plug is directed by the seat to wash off débris which may fall upon the plug.

Now, having described my invention, what I claim as new, and desire to secure by Letters Patent, is—

1. In an irrigating hydrant, the combination of the supply pipe: the T connected therewith: a reducer screwed into the stem of the T; the hydrant pipe screwed into such reducer, and provided with the transverse plug rod securing bar: the plug fitted to close the lower end of the reducer or hydrant pipe, and attached to the plug rod: such plug rod provided with a handle and suitable flanges or projections to engage the transverse bar to sustain the plug.

2. The combination of a hydrant provided with a cross bar near its upper end: a valve seat at the bottom of such hydrant: a valve plug in such valve seat and attached to a plug rod, and such plug rod extending upward to the top of such hydrant and provided with the flanges or projections adapted to engage the cross bar to hold the valve plug in position.

BYRON O. CLARK.

Witnesses:
JAMES R. TOWNSEND,
F. M. TOWNSEND.